G. H. LAUGHLIN.
CANDY MACHINE.
APPLICATION FILED JAN. 29, 1908.
904,704.
Patented Nov. 24, 1908.
3 SHEETS—SHEET 3.
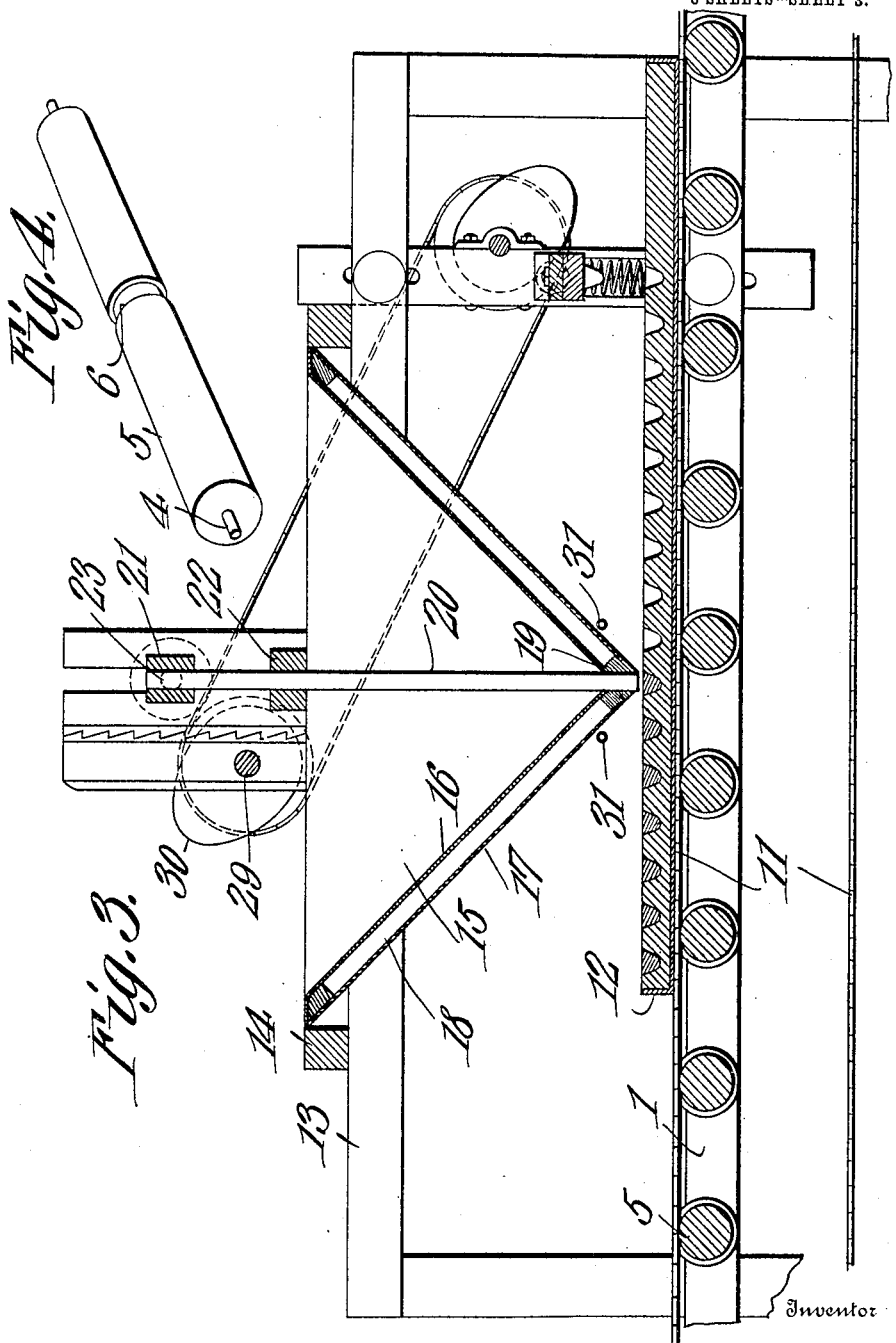
Witnesses
E. T. Stewart
F. T. Chapman
Inventor
George H. Laughlin.
By C. A. Snow & Co.
Attorneys

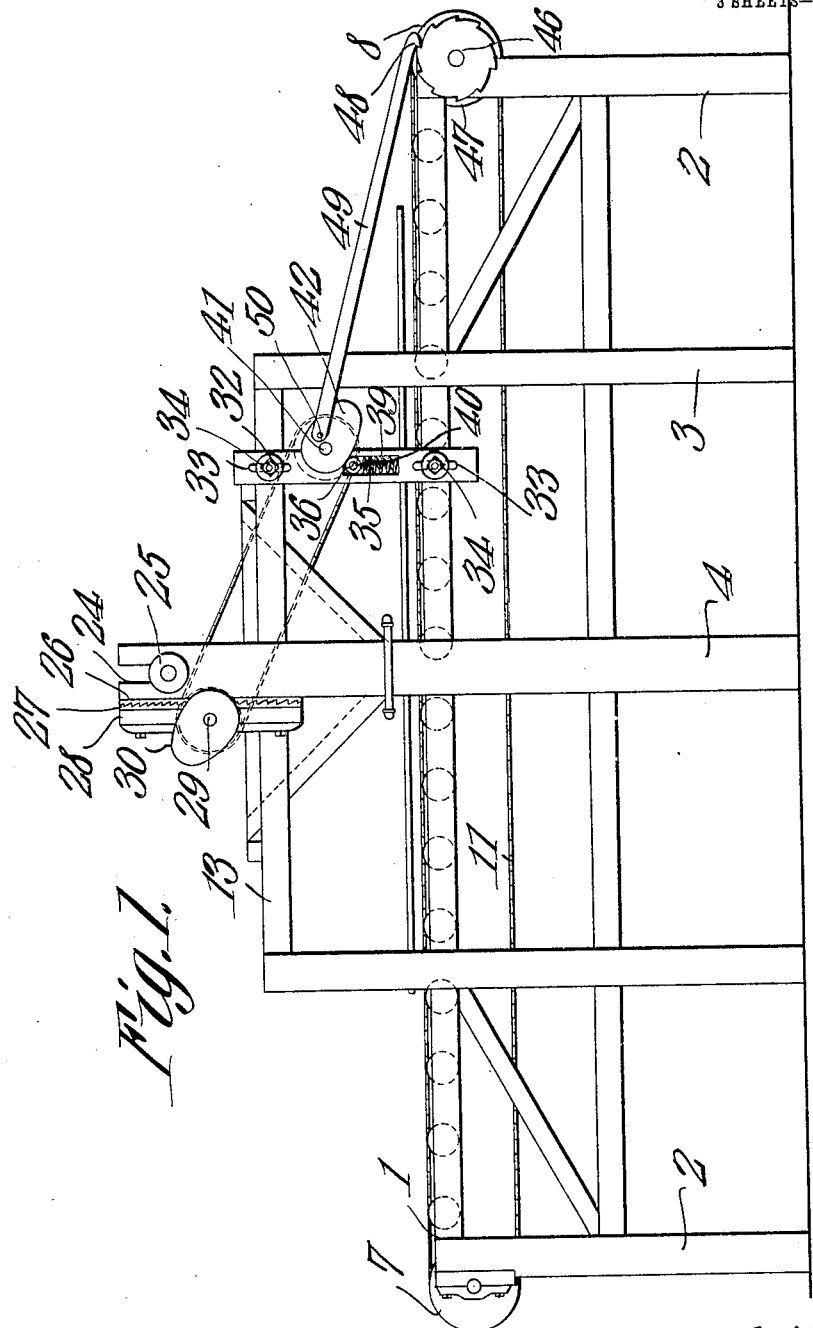

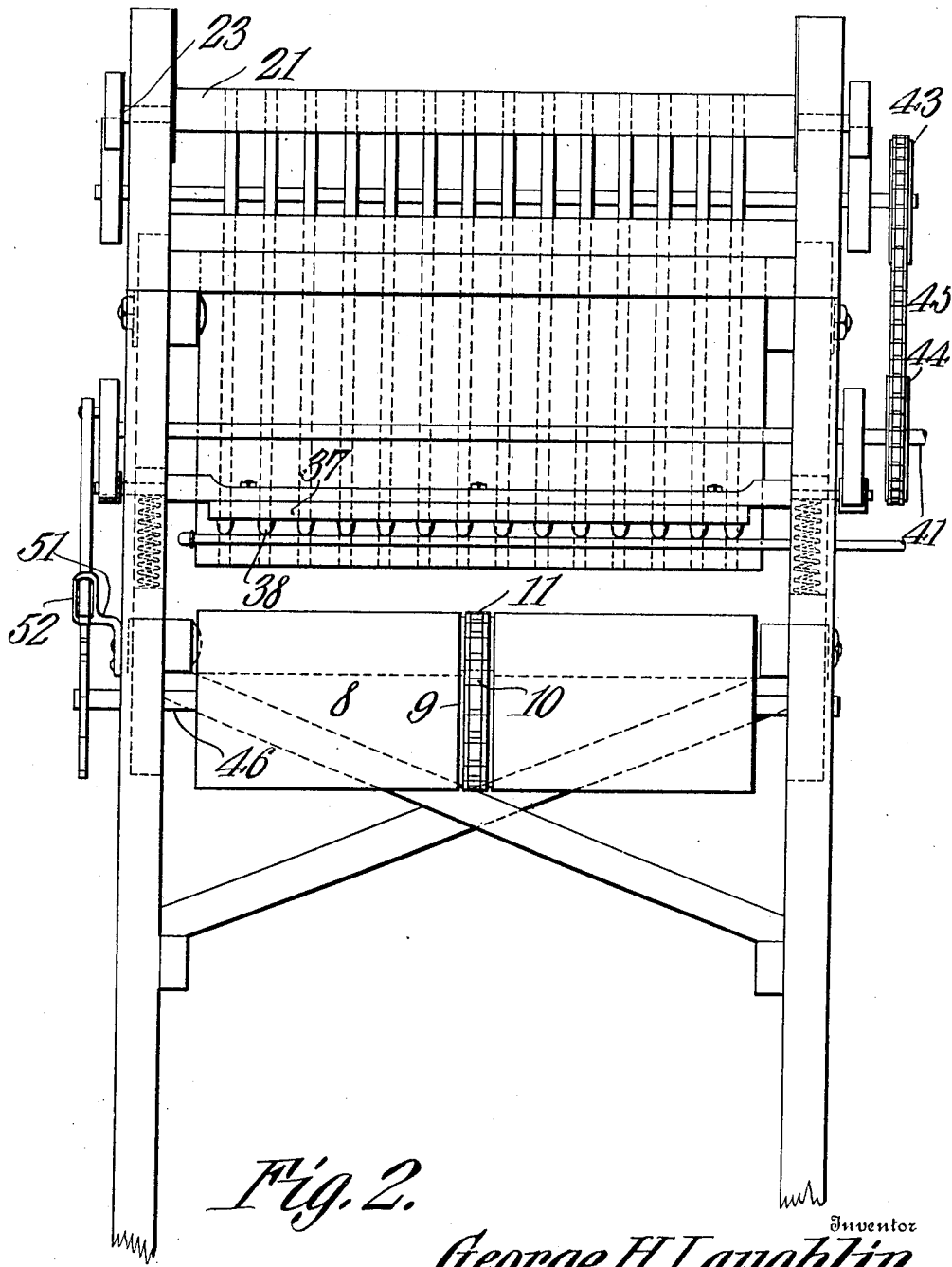

UNITED STATES PATENT OFFICE.

GEORGE HENNERY LAUGHLIN, OF KEWANEE, ILLINOIS.

CANDY-MACHINE.

No. 904,704.

Specification of Letters Patent.

Patented Nov. 24, 1908.

Application filed January 29, 1908. Serial No. 413,319.

*To all whom it may concern:*

Be it known that I, GEORGE H. LAUGHLIN, a citizen of the United States, residing at Kewanee, in the county of Henry and State of Illinois, have invented a new and useful Candy-Machine, of which the following is a specification.

This invention has reference to improvements in candy machines designed more particularly for dropping soft cream centers or other candies where molds are used.

The object of the present invention is to provide a means whereby the operation of the impressioner for forming the molds in the starch tray and the dropper for the candy composition shall be entirely automatic and the parts adjusted for forming different sized molds and candy units, as desired.

The invention comprises a suitable machine comprising a hopper or receptacle for the candy composition, kept at a suitable temperature by a water bath which may be maintained hot by gas flames impinging directly on the exterior of the water bath, and this hopper is provided with plungers such as are commonly employed for the purpose of forcing out predetermined quantities of the candy composition to be deposited in molds prepared for the purpose. The plungers used for the purpose of ejecting the candy composition may have their length of travel adjustable so that the quantity of candy composition ejected at each active movement of the plungers may be made large or small according to the wish of the operator. In conjunction with the receptacle for the candy composition there is provided an impression member capable of moving to and from a starch tray, which latter is caused to travel intermittently under the impression member, and this last-named member is also adjustable as to the active stroke so as to make a greater or less depth of impression in the starch tray.

The invention comprises means for accomplishing these results and will be more fully understood from a consideration of the following detail description taken in connection with the accompanying drawings forming a part of this specification, in which drawings—

Figure 1 is a side elevation of the machine with parts omitted. Fig. 2 is an end view of the machine on a larger scale than shown in Fig. 1. Fig. 3 is a central longitudinal section through the middle portion of the machine, and Fig. 4 is a perspective view of one of the supporting rollers for the starch tray.

Referring to the drawings, there is shown a suitable framework consisting of longitudinal side members 1, upright members 2—3—4, and such transverse members and brace members as may be necessary for the structure of the framework. Either wood or metal may be used as desired, and the precise structure of the framework will depend upon the particular material used. In the drawings it is assumed that the framework is made of wood, but it is to be understood that this framework may as well be made of metal.

Journaled in the side members 1 are the pintles 4 of a longitudinal series of rollers 5, each roller being formed with a central circular groove 6. At the two ends of the framework there are large rollers 7 and 8, each of which may have the central circumferential groove 9 formed with sprocket teeth 10, or only one of these rollers, say the roller 8, may be provided with sprocket teeth. Extending centrally through the framework of the machine and resting upon the rollers 5 in the grooves 6 therein and also extending around the rollers 7 and 8 in the grooves therein and engaging the sprocket teeth 10, is an endless sprocket chain 11. The rollers 5 are for the purpose of carrying a starch tray 12 shown in Fig. 3, and this starch tray may be temporarily secured to the chain 11 in such manner as to be carried forward by the same when this chain is actuated in the manner to be described. The starch tray is such as is usually employed for chains of this character and need not be particularly described. In practice, a number of these starch trays are provided so that when one has passed through the machine another may follow while the contents of the first one are being removed. The uprights 3 are higher than the uprights 2 and project above the plane of travel of the starch tray, and at their upper ends these uprights 3 carry longitudinal members 13 and cross strips 14 to constitute a supporting means for a prismatic receptacle 15 for the candy composition. This receptacle is made double walled having an inner lining 16, which as is usual in such structures, may be made of copper and an outer lining 17 of galvanized iron or other suitable material. There is thus formed between the two walls 16 and 17 a water chamber 18 constituting a water bath for the contents of the receptacle. The side walls of the receptacle slope one toward the other toward the lower end, and the receptacle is there provided with a suitable number or a series of perforations 19 receiving plungers 20, of which latter there are as many as may be desired. These plungers are formed in a single longitudinal series fast at their upper ends to a strip 21 and passing through a guiding member 22 at an intermediate point. From the ends of the strip 21 project rods 23 extending through vertical slots 24 in the upper end of the uprights 4 which are carried up above the longitudinal member 13, before mentioned. At the outer ends of the rods 23 there are mounted rollers 25. On one side of each upright 4 near the upper end, is secured a toothed bar 26, and arranged to engage this toothed bar is another reversely-toothed bar 27 fast on a block 28, there being one block 28 and two toothed bars 26 and 27 on the corresponding side of each upright 24.

Journaled in the blocks 28 is a shaft 29 carrying at each end beyond the block a cam 30, in the path of each of which is a respective one of the rollers 25. The structure is such that when the shaft 29 is rotated the cams 30 participate in this rotation, and ultimately engage the rollers 25 and cause an upward movement of the plungers 20. The candy composition within the receptacle 15 is maintained in a suitably soft or semi-liquid condition by heat applied to the water bath in the chamber 18, and this heat may be supplied by means of flames issuing from gas pipes 31 on each side of the exterior of the receptacle 15 near its lower end, the said pipes being suitably perforated to direct gas flames when the gas is properly ignited against the outer walls 17 of the receptacle 15. This gas may come from a suitable source of supply and may be regulated to provide the desired degree of heat.

On each side of the machine at a suitable point and secured to the longitudinal timbers 1 and 13 are upright strips 32 each provided near its end with a longitudinal slot 33 for the reception of a bolt 34 securing the strip to the corresponding members 1 and 13. There are two such strips 32, and each has an intermediate longitudinal slot 35 receiving and guiding the respective end of a corresponding rod 36, which rod, between the strips 32, is suitably formed to have secured to it the impression or molding member 37 carrying on its under surface a longitudinal series of projections 38 of suitable shape and size to form depressions in the mass of starch in the starch tray. The impression member is upheld by the normal action of springs 39 housed in the slots 35 and the ends of the rods 36 beyond the strip 32 carry small rollers 40. Journaled in suitable bearings formed in the strips 32 is a transverse shaft 41 carrying at each end outside the strips 32 a cam 42, in the path of which is located the respective roller 40. The shaft 41 may be continued sufficiently beyond one of the side members 32 and the corresponding cam to permit the application of power to this shaft, so that it becomes the drive shaft of the machine. Exterior to the cams 30 and 42 on one side of the machine, the shafts 29 and 41 carry sprocket-wheels 43 and 44, respectively, and these wheels are connected by a sprocket chain 45.

The roller 8 is mounted upon a suitable shaft 46 and this shaft beyond the side member 1 and upright 2 carries a ratchet wheel 47. This ratchet wheel is engaged by the toothed end 48 of a link 49 connected at its other end by the pin 50 to an appropriate point on the cam 42. For the purposes of accommodating the machine to candy units of different sizes, this pin may be made adjustable on the cam 42 to and from the axis of the said cam. In order that the link 49 may be suitably guided a bracket 51 is provided, and this bracket has an elongated eye 52 through which the link 49 passes. The bracket is made fast on one of the longitudinal members 1.

If there be provided a suitable supply of candy composition within the receptacle 15 and the starch tray 12 be placed upon the right hand end of the machine as viewed in Fig. 1, and power be applied to the shaft 41, then the parts are so timed in operation that the tray will be moved forward a certain predetermined distance by the engagement of the tooth 48 with one of the teeth of the ratchet wheel 47, and when this tray is in proper operative position with relation to the impression member 37, the latter is forced downward into the contents of the starch tray to an extent depending upon the throw of the cam 42, the action of the cam 42 being properly timed with relation to the action of the tooth 48 on the ratchet 47. Assuming that a suitable number of impressions have been made in the starch tray it ultimately comes into coincidence with the perforations 19 in the lower end of the receptacle 15, and the cam 30 acting upon the rollers 25 lift the series of plungers 20 so as to allow charges of the candy material to find their way into the openings 19 to be ultimately ejected by the return movement of the plungers 20 when released from the lifting action of the cams 30. There is thus provided a progressive operation, the molds being formed by the impression member 37 in the starch tray in advance of and in proper relation to the lower end of the candy receptacle, and the parts are so timed that the impression of the molds into the starch tray and the dropping of the candy composition into these molds takes place while the tray is quiescent, while the inactive movement of the cams is coincident with the forward movement of the tray under the action of the link 49 and its tooth 48.

Should it be desired to vary the depth of the impressions made in the starch tray the impression member may be made to move toward the tray to a less extent by moving the strips 32 upwardly, and though the impression member maintains its full extent of travel it moves toward the starch tray to a relatively less extent and so the depth into the starch tray into which the members 38 are projected is lessened and the molds for the reception of the charges of candy composition are correspondingly shallower. The extent of movement of the plungers 20 through the openings 19 is also adjustable by means of the tooth bars 26 and 27. By this latter means the amount of the candy composition which is forced through the lower end of the receptacle at each active movement of the plungers is made large or small as desired. These adjustments of the impression member and of the plungers for forcing out the candy composition do not interfere at all with the transmission of power from the shaft 41 to the shaft 29 through the sprocket connections, since these connections are sufficiently flexible for the purpose. Should it be desired to change the extent of progress of the starch tray so as to provide for different sized candies, then the ratchet wheel 47 may be replaced with one having more or less teeth and the extent of throw of the link 49 may be made commensurate with the size of the teeth of the ratchet wheel 47 by adjusting the pin 50 to a greater or less extent from the axis of the shaft 41.

If it be desired to do away with the impression member then rubber or other molds may be used instead of employing the starch tray.

What is claimed is:—

1. In a candy machine, a dropper for the candy composition, a mold forming mechanism and means for adjusting the candy-dropping mechanism to control the amount of candy mixture from the ejector consisting of a guided support for the dropping mechanism, a fixed toothed block, another toothed block in operative relation to the fixed toothed block and adjustable thereon, a cam shaft having journals in the adjustable toothed block, and cams carried by the cam shaft in operative relation to the guided portion of the dropping mechanism.

2. In a candy machine, a dropper for the candy composition consisting of a strip carrying a number of plungers, a candy receptacle through which the plungers extend, fixed guides for the strip, rollers carried by the strip exteriorly to the guides, toothed blocks carried by the guides, other adjustable toothed blocks in operative relation to the first-named toothed blocks, a shaft journaled in the second-named toothed blocks, and cams carried by said shaft in operative relation to the rollers on the ends of the strip.

3. In a candy machine, molding means having a reciprocatory movement, cams in constant relation to the molding means for causing said reciprocatory movement always to the same extent, and mounted in fixed relation to the reciprocatory carriers for the mold forms, and means for adjusting the cams and mold form carriers simultaneously and to the same extent with relation to the mold receiving means for limiting the active movement of the mold producing devices into the mold carrier.

4. In a candy machine, molding means having a reciprocatory movement and provided with end supports, slotted strips receiving said end supports, springs in the slots engaging the supports, cams in operative relation to the supports and journaled on the strips, and means for adjusting the strips together with the cams and molding means with relation to a fixed portion of the machine.

5. A candy machine comprising a receptacle for the candy mixture, means for maintaining the same in a heated condition, reciprocating plungers in operative relation to the delivery end of the receptacle, cams for actuating said reciprocating plungers, shafts for the cams, adjustable supports for the cam shafts comprising fixed toothed blocks and other adjustable toothed blocks engaging the fixed toothed blocks and receiving the journals of the cam shafts, a mold carrier, supports for the mold carrier, adjustable slotted strips receiving the supports for the mold carrier, springs in the slots in the strips for elevating said mold carrier, cams mounted on the adjustable strips in operative relation to the mold carrier, an endless band for starch trays for conveying the latter beneath the mold carrier and candy receptacle in succession, and a pawl and ratchet actuating means connected to one of the cams actuating the mold carrier and operating to advance the endless band step-by-step in timed relation to the movement of the mold carrier and ejecting plungers for the candy composition.

6. In a candy machine, a receptacle for the candy composition, plungers for forcing the composition out of the receptacle in predetermined quantities, and a compression member for forming the molds for the candy composition, adjustable cams for determining the active extent of both the mold-forming means and the dropping means for the candy composition and for driving said means, and flexible connections between the cams for imparting simultaneous driving movement thereto.

In testimony that I claim the foregoing as my own, I have hereto affixed my signature in the presence of two witnesses.

GEORGE HENNERY LAUGHLIN.

Witnesses:
GEO. S. GREEN.
FRANK A. METCALF.